(12) United States Patent
Dallas et al.

(10) Patent No.: US 11,075,531 B2
(45) Date of Patent: Jul. 27, 2021

(54) POWER TOOL ACTIVATION CONTROL SYSTEMS AND METHODS

(71) Applicant: Oregon Tool, Inc., Portland, OR (US)

(72) Inventors: Edgar A. Dallas, Beaverton, OR (US);
Jonathan Ziring, Portland, OR (US);
Noah Erickson, Portland, OR (US)

(73) Assignee: Oregon Tool, Inc., Portland, OR (US)

( * ) Notice: Subject to any disclaimer, the term of this patent is extended or adjusted under 35 U.S.C. 154(b) by 93 days.

(21) Appl. No.: 16/294,867

(22) Filed: Mar. 6, 2019

(65) Prior Publication Data

US 2019/0280507 A1  Sep. 12, 2019

Related U.S. Application Data

(60) Provisional application No. 62/641,155, filed on Mar. 9, 2018.

(51) Int. Cl.
*H02J 7/00* (2006.01)
*B25F 5/00* (2006.01)

(52) U.S. Cl.
CPC .............. *H02J 7/0063* (2013.01); *B25F 5/00* (2013.01); *H02J 7/0047* (2013.01); *H02J 7/0048* (2020.01); *H02J 2007/0067* (2013.01)

(58) Field of Classification Search
CPC ...... H02J 7/0047; H02J 7/0048; H02J 7/0063; H02J 2007/0067; B25F 5/00

USPC .......... 320/111, 114, 136, 155, 158
See application file for complete search history.

(56) References Cited

U.S. PATENT DOCUMENTS

| | | | |
|---|---|---|---|
| 2006/0037766 A1* | 2/2006 | Gass | B25F 5/02 173/20 |
| 2008/0017689 A1* | 1/2008 | Simonelli | B25C 1/008 227/132 |
| 2012/0031635 A1* | 2/2012 | Svennung | F16P 3/00 173/20 |
| 2014/0116737 A1* | 5/2014 | Iwata | B25F 5/001 173/20 |
| 2016/0149520 A1 | 5/2016 | Ota et al. | |

FOREIGN PATENT DOCUMENTS

WO   WO2010115439 A1   10/2010

* cited by examiner

*Primary Examiner* — Edward Tso
*Assistant Examiner* — Aaron Piggush
(74) *Attorney, Agent, or Firm* — Schwabe, Williamson & Wyatt, P.C.

(57) ABSTRACT

Embodiments herein describe methods and systems for controlling the power state of a tool. A tool is placed into an active mode upon initial power up, as typically indicated by one or more indicators. The tool is automatically placed into an inactive mode upon the expiration of a timer, if the tool motor was not activated. If the tool is activated, such as by pressing the tool switch, prior to expiration of the timer, the timer resets. A display is provided to signal the user as to the current active status and/or current mode of the tool.

9 Claims, 2 Drawing Sheets

POWER TOOL ACTIVATION CONTROL SYSTEMS AND METHODS

CROSS-REFERENCE TO RELATED APPLICATION

This application claims the priority benefit of the earlier filing date of U.S. Provisional Application No. 62/641,155, filed Mar. 9, 2018, which is hereby incorporated herein by reference in its entirety.

TECHNICAL FIELD

Embodiments herein relate to the field of power tools, and more specifically, to systems and methods for controlling the activation of a power tool, including activation mode logic.

BACKGROUND

Many power tools are available with cordless power options, such as lithium-ion battery packs, that offer power comparable to corded tools, but with greater convenience and maneuverability. Such tools include yard and landscape maintenance implements, like hedge trimmers, lawn mowers, chain saws, and the like. When a cordless power tool has a battery attached, it may be ready for immediate activation. Similarly, most corded tools may be ready for immediate activation upon being plugged in. However, for safety reasons, power tools should only activate when intended by a user.

Power tools may also offer various power modes of operation, e.g. a low power mode and a full power mode. Low power modes may be useful where a power tool is used in a noise sensitive environment (a so-called "Stealth Mode"), where a measure of performance can be sacrificed for a reduction in noise, and/or to conserve energy. This may be particularly useful for cordless/battery powered tools, where conserving energy can yield greater run times between battery swaps/charges.

Activation states and power states of power tools may be managed by a control module. In some implementations, the control module may comprise a programmable logic controller (PLC) or similar microcontroller, which can be configured to manage a tool's power state according to various logical steps.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
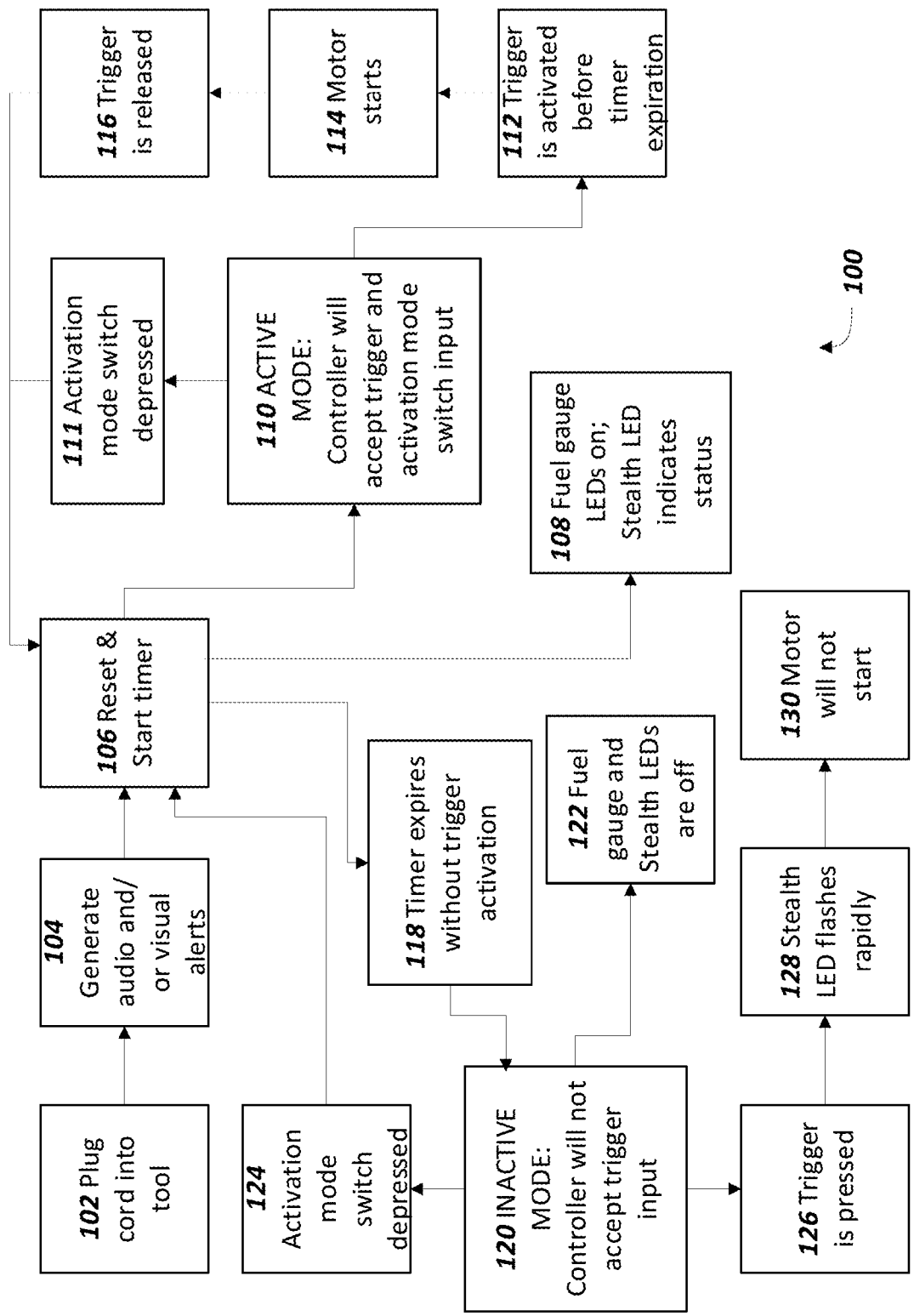
FIG. 1 illustrates the flow of the activation mode logic of a power tool, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

Call-outs for components that are present in multiples may be numbered identically, with a letter suffix distinguishing each instance of the multiple component. For example, where a component 102 is present multiple times in a figure, each instance of component 102 may be designated 102a, 102b, 102c . . . 102x. Referring to a component by its call-out without the letter, e.g. component 102, should be understood to refer to any or all instances of component 102a-102x, while reference to a specific instance of a component 102 will include its letter, e.g. component 102b.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Figure 2:
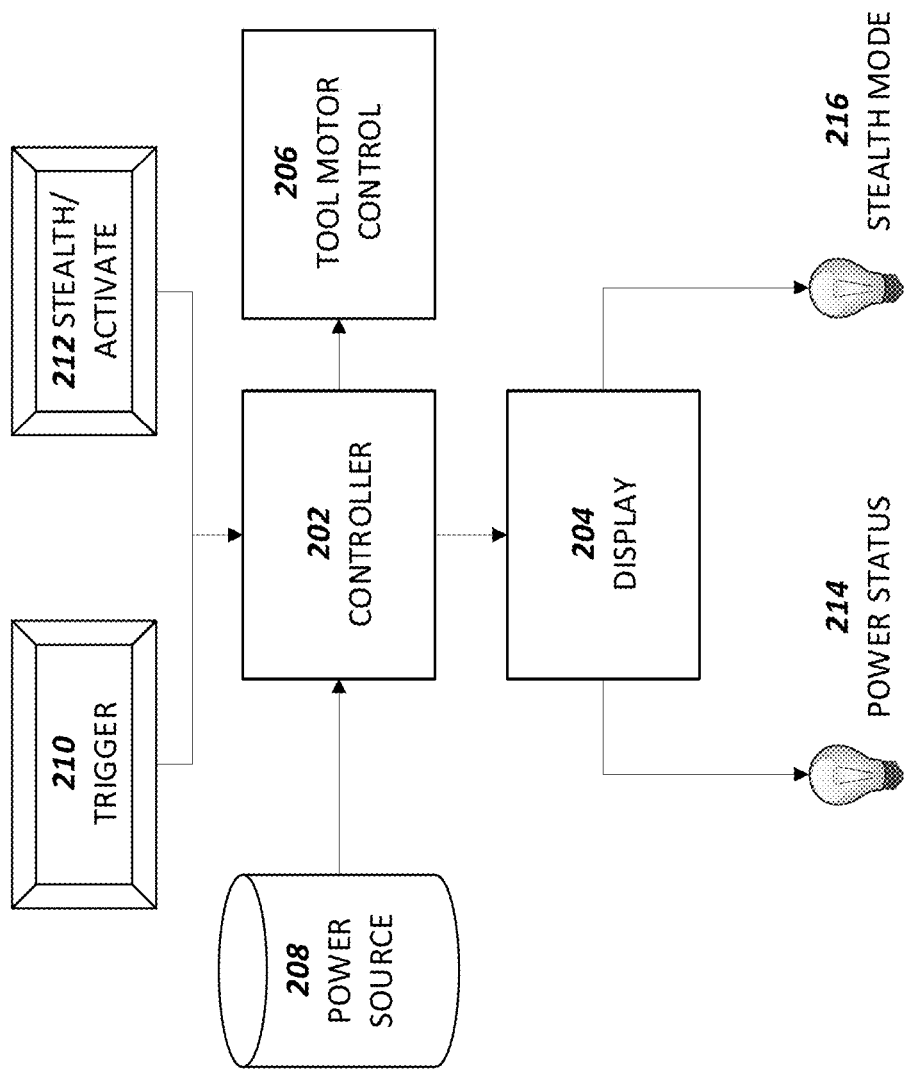
FIG. 2 depicts a block diagram of the components of a power tool that implements the disclosed tool activation control systems and logic, according to various embodiments.

With reference to FIG. 1, method 100 depicts the logic flow for a method of managing the activation state and power of a power tool. Method 100 starts with block 102, where a power tool is initially powered by plugging it in, or, in the case of a cordless tool, a battery pack is plugged in or snapped into position. The tool may immediately enter an active mode, as will be described in greater detail herein. Following power-up, method 100 proceeds to block 104, where an audible and/or visual alert may be issued to alert the user to the tool's active mode. Audible alerts may comprise a buzzer, beep, klaxon, or other noticeable alert. Visual alerts may comprise one or more lights (such as LEDs, incandescent bulbs, or other such lamps). For example, in some embodiments, as may be seen in FIG. 2, a display 204 may include one or more power status lights 204 and a stealth mode light 216, which may be flashed, illuminated, or sequenced by a controller 202 that implements some or all of method 100.

Following activation and alerting the user to the tool's active status, method 100 includes resetting and activating a timer in block 106, the elapsing of which will place the tool into an inactive status. The timer may be set to an amount of time deemed appropriate for the tool. For example, in some embodiments the timer may be set to a maximum of 45 seconds, due to certification or compliance standards. Some tools may have a shorter timer where it is desired that the tool enter an inactive mode sooner, and conversely, some tools may remain in an active mode longer, if suitable for the tool and/or if compliance standards so permit. Factors to be considered when determining an appropriate timer length may include, in addition to compliance and other relevant standards, the nature of the tool and any hazards it presents, as well as the types of jobs for which the tool is designed. Tools that are potentially more hazardous, e.g. a chain saw as opposed to a leaf blower, may be set to enter an inactive mode comparatively sooner. Similarly, tools designed for jobs where tool use is more intermittent may be configured with a longer timer, to avoid the user having to repeatedly reactivate the tool in the middle of a job.

In still other embodiments, the timer may be user configurable, where a user may set a tool to a shorter or longer time before deactivation depending upon the user's preferences. In embodiments with a user-configurable timer, there nevertheless may be a limit or constraint on the range within which the user can adjust the timer that may be dictated by equipment and/or safety considerations (such as target battery life or power consumption), compliance standards, regulations, or other external factors.

While the timer is active, the tool may be in an active power state, which may be indicated by a visual alert in block 108. For example, in some embodiments, power status lamp(s) 214 may be illuminated to indicate that the tool is in an active mode, and/or may also (in the case of a cordless tool) indicate the charge status of the battery pack. In other embodiments, a tool may have a dedicated status lamp that indicates whether the tool is active or inactive, that is separate from any other lamps, e.g. battery status/charge status/stealth mode, etc.

As mentioned earlier, in embodiments when the tool is initially powered up in block 102, it enters into an active mode while the timer in block 106 is still running. The active mode is depicted in block 110. While active, a controller 202 on the tool is configured to accept inputs such as a trigger press for engaging and powering the tool. Controller 202 may also accept inputs from other controls, such as a stealth mode button for modifying the speed and/or power usage of the tool. In still other embodiments, the tool may accept inputs from various buttons and/or controls while the tool is in an inactive mode, e.g. allow placing the tool into a different configuration or toggling between stealth and non-stealth modes, power saving modes, checking battery status, etc.

While the tool is in an active mode in block 110, a user may depress the tool's trigger. If, in block 112, the trigger is pressed prior to the expiration of the timer, the tool will be in an active mode and, in block 114, will start. This may include powering up a motor or could include throttling up an engine, as appropriate to the tool. The trigger or other activation control may be used to engage the tool for its intended purpose, e.g. starting a chain saw for cutting, engaging the blower in a leaf blower, etc. Other systems in the tool may further be engaged as appropriate to the tool's operation. Alternatively, in block 111 the user may depress the activation mode switch to maintain the tool in an active mode. Depressing the activation switch while the tool is in active mode will cause the timer to reset. In other embodiments, depressing the activation switch while the tool is active will also, in addition to resetting the timer, cause a mode change in the tool, such as toggling between stealth and non-stealth mode, or altering the tool's operating speed. In still other embodiments, there may be multiple activation buttons.

In embodiments, the trigger and/or activation switch may be of a momentary type, where the switch is closed only as long as a user is actively depressing the switch. When the user discontinues depressing the switch, a spring or return mechanism reopens the switch. The timer may be configured to reset upon depressing the switch or, in other embodiments, upon release of the switch. In embodiments where the timer resets upon release, the timer may be configured to hold or stop while the button is depressed, such as when the trigger is being held down during tool use. Other embodiments, if compliance standards permit, may implement a non-momentary switch, e.g. toggle type, where the timer may reset upon a switch toggle.

Once the user is finished, the user may release the trigger or other activation control in block 116, which then resets the timer and returns to block 106, as the timer is again started. As previously discussed, the tool may remain in an active mode as the timer counts down. The reader will appreciate that blocks 106 to 116 can form an iterating loop. So long as the tool is activated before the timer elapses, the timer will reset following completion of each activation, and the tool will remain in an active mode. In this way, the tool user can carry out a task using the tool as normal, without any additional steps needed for activation. As noted above, the timer in block 106 may be set to a duration that reflects the typical use pattern for the tool, with consideration possibly given to such aspects as safety factors and power consumption.

If the user does not activate the tool, the timer may expire without receiving a trigger press or actuation in block 118. Method 100 would then proceed in block 120, with the tool being placed into an inactive mode or state. While in an inactive mode, controller 202 will not respond to a trigger press or other actuation to start the tool. Reflecting this state, in block 122 the power status lamps 214 and stealth mode lamps 216, for example, may be dark or unlit, to signal that the tool has been placed into an inactive mode. Alternatively, the tool may have an indicator specifically to signal that the tool is in the inactive mode, or a status indicator that may change color or visual appearance when the tool is placed in an inactive mode.

While in inactive mode, the user may bring the tool back to active mode by depressing or otherwise actuating an activation switch or toggle, per block 124. Once placed back into active mode, method 100 proceeds back to block 106, with the timer being reset and again starting to count down. In some embodiments, the activation switch may be a single-purpose dedicated toggle. In other embodiments, the activation switch or toggle may double as a stealth or speed mode switch, as will be discussed herein, with its function determined by the particular current power state of the tool.

For example, in some embodiments the switch may act as a stealth or speed mode switch when the tool is in an active mode, and act as an activation or wake up switch when the tool is in an inactive mode. When placed back into an active mode from an inactive mode, in some embodiments, the tool may issue a visual and/or audible alert, similar to the alert generated in block 104 upon initially powering the tool.

If, in block 126, the user depresses the trigger or otherwise attempts to activate the tool while the tool is in an inactive mode, the tool may warn or otherwise notify the user of the device's current state using a visual and/or audible alert. In some example embodiments, in block 128 the stealth (or speed mode) LED may flash, change color, or otherwise uniquely signal to the user that the tool is currently in a sleep state or inactive mode. Other embodiments may further use an audible signal or buzzer, possibly in conjunction with the visual signal, to positively indicate to the user that the tool is in an inactive mode. At the same time, in keeping with the inactive state, the controller 202 will not activate the motor or otherwise engage the tool, per block 130.

Thus, the device is rendered inactive if unused for the amount of time determined by the timer, and must be positively reactivated by the user. This may help prevent inadvertent activation of a tool that has been set down for a period of time and is again picked up in a way that accidently engages the tool's trigger or actuator.

Referring again to FIG. 2, the various block components of an example tool that implements method 100 are depicted. Controller 202 may be a microcontroller, microprocessor, embedded controller, application-specific integrated circuit, field programmable gate array, programmable integrated circuit, discrete circuit and/or components, or another suitable technology that is capable of implementing some or all portions of method 100. Controller 202 may be in communication with various other components of the tool, such as a display 204 and tool motor control 206.

Display 204 may include various indicators such as power status lamp 214 and stealth mode lamp 216. As described above, power status lamp 214 may indicate whether the tool is in an active or inactive mode. Power status lamp 214 may further indicate the charge condition of the battery pack where the tool is a cordless tool. Stealth mode lamp 216 may indicate the particular speed mode of the tool. Some tools may be configured to switch between low and high (or full) speed modes, where low power mode may trade power for a quieter noise profile and/or better battery longevity. Other embodiments of the tool may implement greater than two speed modes, and so stealth mode lamp 216 may reflect multiple possible speed modes.

In various embodiments, power status lamp 214 and stealth mode lamp 216 may each comprise multiple lamps, such as where power status lamp 214 can indicate a battery charge. In such embodiments, power status lamp 214 may be comprised of a series of LEDs (or other suitable light elements) in a bar graph arrangement, where the number of illuminated segments reflects the battery charge. Similarly, the stealth mode lamp 216 may comprise multiple segments, depending upon how a particular embodiment implements multiple speed modes. Each of power status lamp 214 and stealth mode lamp 216 may be implemented using any suitable lamp technology, such as LED, fluorescent, incandescent, or another suitable light technology. Display 204 may also include an audible alert device, such as a buzzer or tone generator.

Tool motor control 206 may include any circuitry appropriate to control activation and engagement of the tool. In embodiments where the tool uses an electric motor for power, tool motor control 206 may include an electronic speed control or other motor controller. Other embodiments may further include devices for engaging drive mechanisms, such as a clutch. In some embodiments, controller 202 and tool motor control 206 may exchange communications, such as the status of any control circuitry in tool motor control 206, e.g. whether an electronic speed controller was able to successfully engage and control a tool motor. In other embodiments, controller 202 may simply signal tool motor control 206 to engage or stop.

Controller 202 may accept inputs from various sources, including a power source 208, trigger 210, and stealth/activate button 212. When power source 208 is connected, it may cause controller 202 to begin executing some or all of method 100, as detailed above. Power source 208, it will be understood, also may supply working power for controller 202, and may cause controller 202 to initialize or otherwise boot, depending upon the particular embodiment of controller 202. Power source 208 may be any source that is appropriate to power the tool, such as a battery pack or cord.

Trigger 210 may signal controller 202 that a user wishes to engage and begin using the tool, and cause controller 202 to act in accordance with method 100. Trigger 210 may be a single push button or toggle in some embodiments, or in other embodiments may include a variable control to allow for varying the speed of the tool, such as where a chainsaw allows the chain speed to be varied as the user deems appropriate to a particular job. Similarly, stealth/activate button 212 may be a push button that signals controller 202 to wake up the tool, and move the tool from an inactive mode to an active mode. As noted above, the functions of stealth/activate button 212 may be split between separate buttons, e.g. with one button for activating the tool (moving from an inactive to an active mode), and a second button selecting a speed or power mode. Stealth/activate button 212 may further be variable, like trigger 210 in some embodiments, such as where the speed or power mode may have multiple or variable levels.

In some embodiments, the different speed or power modes may be implemented between the controller 202 and tool motor control 206. While the tool is in an active mode, controller 202 may accept actuations of the stealth/activate button 212 and toggle the tool's speed mode. When trigger 210 is actuated, controller 202 may determine the current speed based upon whether stealth/activate button 212 was actuated, and direct tool motor control 206 to engage the tool at the appropriate speed and power. Where the stealth/activate button 212 allows for toggling between multiple possible speed modes, controller 202 may reference the currently selected speed mode upon actuation of trigger 210.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Moreover, the embodiments described in the various figures may be mixed and matched as appropriate for an intended purpose without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method for controlling the power mode of a tool, comprising:
   setting the tool to an active power mode and initiating a timer in response to connecting the tool to a power source;
   activating the tool in response to actuating a first control if the timer has not yet elapsed;
   setting the tool to an inactive power mode upon the timer elapsing;
   setting, when the tool is in the inactive power mode, the tool to the active power mode and reinitiating the timer in response to actuating a second control; and
   switching, when the tool is in the active power mode, an operational mode of the tool in response to actuating the second control.

2. The method of claim 1, wherein switching the operational mode of the tool comprises toggling between a first speed mode and a second speed mode.

3. A non-transitory computer readable medium (CRM), comprising instructions that, when executed by a processor that controls a tool, cause the tool to:
   enter an active power mode and initiate a timer in response to connecting the tool to a power source;
   activate in response to actuating a first control if the timer has not yet elapsed;
   enter an inactive power mode upon the timer elapsing;
   reenter the active power mode and reinitiate the timer in response to actuating a second control; and
   switch, when the tool is in the active power mode, an operational mode of the tool in response to actuating the second control.

4. The CRM of claim 3, wherein the instructions are to further cause the tool to switch an operational mode of the tool by toggling between a first speed mode and a second speed mode.

5. A power tool, comprising a controller and a display in communication with the controller, the controller to:
   place the tool into an active power mode and initiate a timer in response to connecting the tool to a power source;
   activate the tool in response to actuating a first control if the timer has not yet elapsed;
   place the tool into an inactive power mode upon the timer elapsing;
   return the tool to the active power mode and reinitiate the timer in response to actuating a second control; and
   switch, when the tool is in the active power mode, an operational mode of the tool in response to actuating the second control.

6. The power tool of claim 5, wherein the display further comprises an indicator of the tool's power mode.

7. The power tool of claim 5, wherein the controller is to further cause the tool to switch an operational mode of the tool by toggling between a first speed mode and a second speed mode.

8. The power tool of claim 7, wherein the display further comprises an indicator of the tool's speed mode.

9. The power tool of claim 5, wherein the controller is to further cause emission of an audio alert upon connecting the tool to the power source.

* * * * *